(12) United States Patent
Wang et al.

(10) Patent No.: US 8,184,166 B2
(45) Date of Patent: May 22, 2012

(54) METHOD, DEVICE, MOBILE TERMINAL AND COMPUTER PROGRAM PRODUCT FOR A CAMERA MOTION DETECTION BASED SCHEME FOR IMPROVING CAMERA INPUT USER INTERFACE FUNCTIONALITIES

(75) Inventors: Kongqiao Wang, Beijing (CN); Jari A. Kangas, Tampere (FI)

(73) Assignee: Nokia Corporation, Espoo (FI)

( * ) Notice: Subject to any disclaimer, the term of this patent is extended or adjusted under 35 U.S.C. 154(b) by 1719 days.

(21) Appl. No.: 11/428,903

(22) Filed: Jul. 6, 2006

(65) Prior Publication Data
US 2008/0007620 A1    Jan. 10, 2008

(51) Int. Cl.
*H04N 5/228* (2006.01)
(52) U.S. Cl. .................................. 348/208.14
(58) Field of Classification Search .............. 348/208.14
See application file for complete search history.

(56) References Cited

U.S. PATENT DOCUMENTS

| 7,271,830 | B2 * | 9/2007 | Robins et al. | 348/208.6 |
| 7,546,026 | B2 * | 6/2009 | Pertsel et al. | 396/52 |
| 2003/0151672 | A1 * | 8/2003 | Robins et al. | 348/208.6 |
| 2010/0013917 | A1 * | 1/2010 | Hanna et al. | 348/143 |
| 2010/0272323 | A1 * | 10/2010 | Oya et al. | 382/107 |

* cited by examiner

*Primary Examiner* — James Hannett
(74) *Attorney, Agent, or Firm* — Alston & Bird LLP

(57) ABSTRACT

A device for utilizing camera motion detection for a camera input interface includes a feature extractor, a feature tracker and a capture module. The feature extractor is configured to determine at least one obvious feature in an image frame. The feature tracker is in communication with the feature extractor. The feature tracker is configured to determine an amount of movement of the at least one obvious feature in a subsequent image frame and compare the amount of movement to a threshold. The capture module is in communication with the feature tracker. The capture module is configured to capture an image in response to the comparison of the amount of movement to the threshold.

31 Claims, 7 Drawing Sheets

METHOD, DEVICE, MOBILE TERMINAL AND COMPUTER PROGRAM PRODUCT FOR A CAMERA MOTION DETECTION BASED SCHEME FOR IMPROVING CAMERA INPUT USER INTERFACE FUNCTIONALITIES

FIELD OF THE INVENTION

Embodiments of the present invention relate generally to camera input user interface technology and, more particularly, relate to a method, device, mobile terminal and computer program product for a camera motion detection based scheme for improving camera input user interface functionalities.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One such expansion in the capabilities of mobile electronic devices relates to an ability of such devices to capture images. In fact, camera functionality has become a popular feature of devices such as mobile telephones. Mobile telephones having image capturing functionality may be referred to as camera phones. Camera phones and other mobile electronic devices capable of capturing images typically enable a person to capture an image which can then be saved, deleted, transmitted to another device, etc.

It is currently common for users of such devices to aim a view finder at an object. When a displayed image of the object appears in focus, the image may be captured, for example, by pushing a button or activating a joystick. However, if the user's hand moves or shakes either while attempting to focus or while pushing the button or activating the joystick, a blurred image may result. If the image captured is a natural scene, the image captured may still be worth saving since, for example, the object may appear at an acceptable quality level while a background behind the object is blurred. However, in certain contexts in which high quality or resolution of captured images is required, the captured image may not be useable if instability is perceptible in the captured image. One example of a context in which high quality or resolution in captured images is desirable arises when a camera phone or other device capable of capturing images is used to input information. For example, optical character recognition (OCR) applications such as a bar code reader, a business card reader, etc., may act as information input devices. In such applications, the image capturing device may advantageously be within about 15 cm from an object of which an image is desired. Accordingly, if an unsteady hand attempts to take the pictures blurring may occur which renders the image useless or severely degraded. Additionally, the action of pressing a button or joystick to capture the image may cause motion that introduces blurring. Furthermore, even if a steady hand is able to capture an image under the circumstances described above, the practice of repeating the action of pressing the button or joystick repeatedly when numerous images are desired can be tedious and undesirable.

In order to provide a solution for the problems described above, it may be advantageous to provide a method for improving camera input user interface functionalities.

BRIEF SUMMARY OF THE INVENTION

A method, apparatus, mobile terminal and computer program product are therefore provided for improving camera input user interface functionalities using a camera motion detection based scheme. Accordingly, one or multiple images may be created without requiring a user to manually activate a button or joystick. Thus, image blurring may be minimized. Furthermore, an intelligent user interface is provided for capturing images only when the image is detected to be stable based on a determination that the image is fixed. The determination that the image is fixed may be made by comparison of obvious features in adjacent image frames.

In one exemplary embodiment, methods and computer program products for improving camera input user interface functionalities using a camera motion detection based scheme are provided. The methods and computer program products include first, second, third, and fourth operations or executable portions. The first operation or executable portion is for determining at least one obvious feature in an image frame. The second operation or executable portion is for determining an amount of movement of the at least one obvious feature in a subsequent image frame. The third operation or executable portion is for comparing the amount of movement to a threshold. The fourth operation or executable portion is for capturing an image in response to the comparison of the amount of movement to the threshold.

In another exemplary embodiment, a device for improving camera input user interface functionalities using a camera motion detection based scheme is provided. The device includes a feature extractor, a feature tracker and a capture module. The feature extractor is configured to determine at least one obvious feature in an image frame. The feature tracker is in communication with the feature extractor. The feature tracker is configured to determine an amount of movement of the at least one obvious feature in a subsequent image frame and compare the amount of movement to a threshold. The capture module is in communication with the feature tracker. The capture module is configured to capture an image in response to the comparison of the amount of movement to the threshold.

In another exemplary embodiment, a mobile terminal for improving camera input user interface functionalities using a camera motion detection based scheme is provided. The mobile terminal includes a feature extractor, a feature tracker and a capture module. The feature extractor is configured to determine at least one obvious feature in an image frame. The feature tracker is in communication with the feature extractor. The feature tracker is configured to determine an amount of movement of the at least one obvious feature in a subsequent image frame and compare the amount of movement to a threshold. The capture module is in communication with the feature tracker. The capture module is configured to capture an image in response to the comparison of the amount of movement to the threshold.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
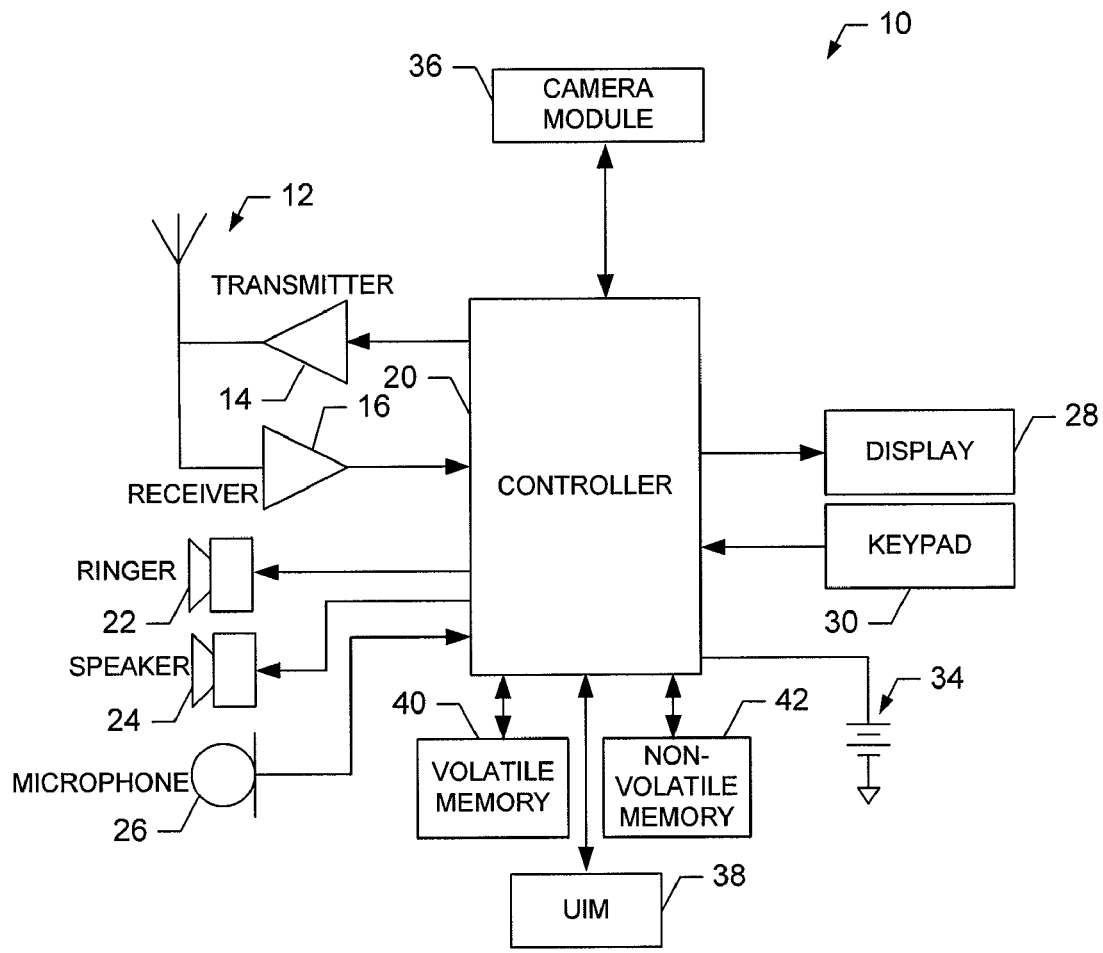
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from the present invention. It should be understood, however, that a mobile telephone as illustrated and hereinafter described is merely illustrative of one type of mobile terminal that would benefit from the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The mobile terminal 10 includes an antenna 12 in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a camera module 36 in communication with the controller 20. The camera module 36 may be any means for capturing an image for storage, display or transmission. For example, the camera module 36 may include a digital camera capable of forming a digital image file from a captured image. As such, the camera module 36 includes all hardware, such as a lens or other optical device, and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
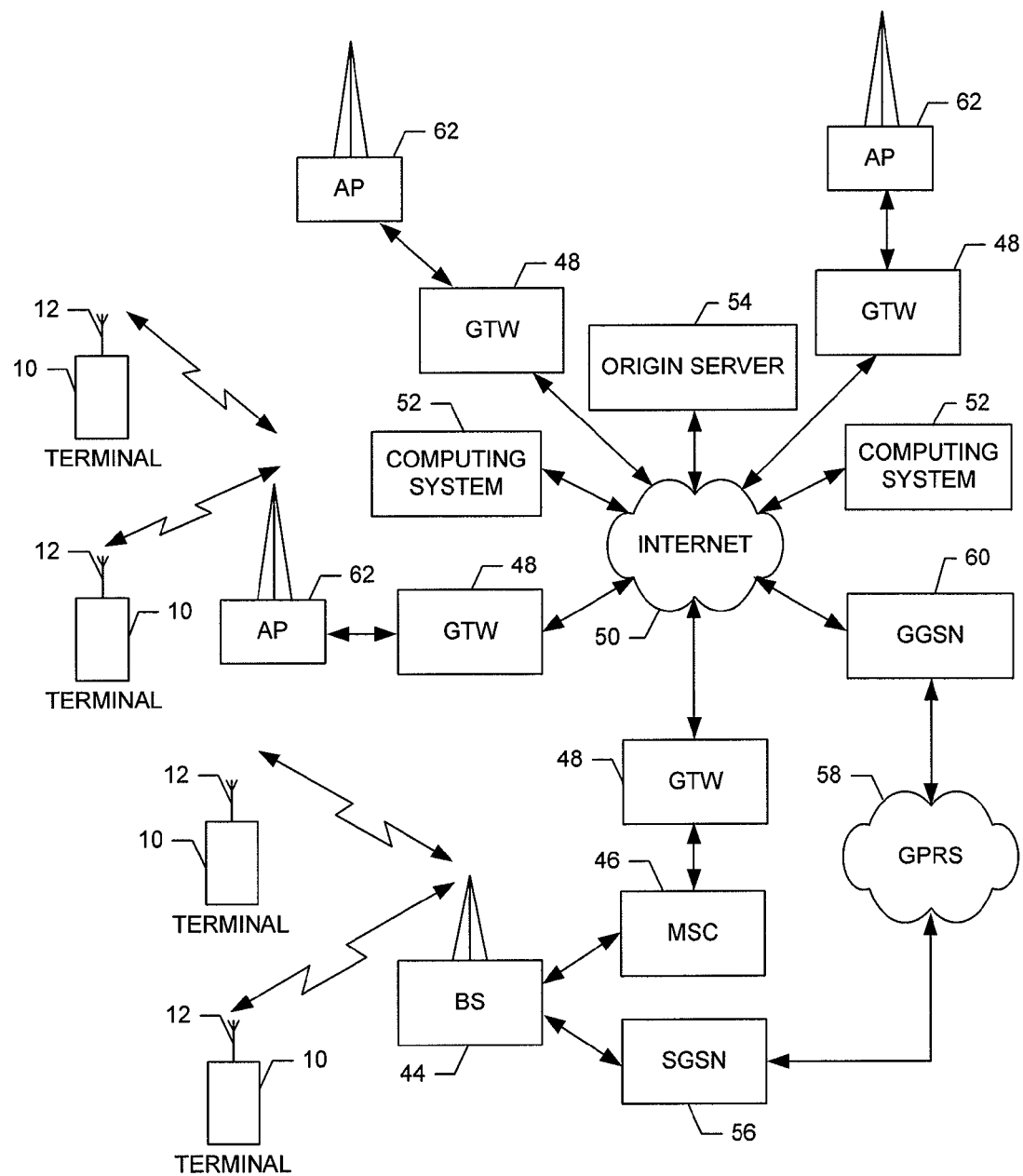
FIG. 2 is a schematic block diagram of a wireless communications system according to an exemplary embodiment of the present invention.

Referring now to FIG. 2, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to FIG. 3, in which certain elements of a system for improving camera input user interface functionalities using a camera motion detection based scheme are displayed. The system of FIG. 3 may be employed, for example, on the mobile terminal 10 of FIG. 1. However, it should be noted that the system of FIG. 3 may also be employed on a variety of other devices, both mobile and fixed, and therefore, the present invention should not be limited to application on devices such as the mobile terminal 10 of FIG. 1 although an exemplary embodiment of the invention will be described in greater detail below in the context of application in a mobile terminal. Such description below is given by way of example and not of limitation. For example, the system of FIG. 3 may be employed on a camera, a video recorder, etc. Furthermore, the system of FIG. 3 may be employed on a device, component, element or module of the mobile terminal 10. It should also be noted that while FIG. 3 illustrates one example of a configuration of the system, numerous other configurations may also be used to implement the present invention.

Figure 3:
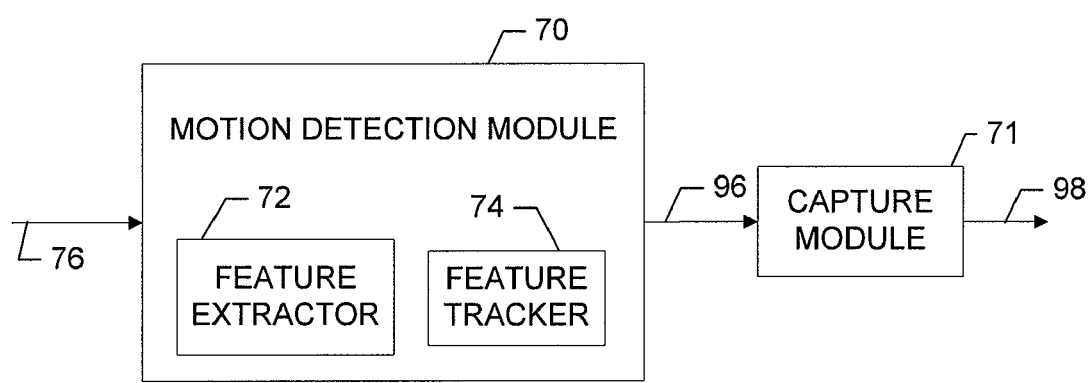
FIG. 3 illustrates a block diagram showing a system for improving camera input user interface functionalities using a camera motion detection based scheme according to an exemplary embodiment of the present invention.

Referring now to FIG. 3, a system for improving camera input user interface functionalities using a camera motion detection based scheme is provided. The system includes a motion detection module 70 in communication with a capture module 71. The motion detection module 70 may be any device or means embodied in either hardware, software, or a combination of hardware and software that is capable of detecting motion between adjacent image frames. The motion detection module 70 may be, for example, a portion of the camera module 36 of FIG. 1 or any other device or module of the mobile terminal 10. Alternatively, the motion detection module 70 may be a separate module in communication with the camera module 36. In an exemplary embodiment, the motion detection module 70 may be embodied in software instructions stored in a memory of the mobile terminal 10 and executed by the controller 20. In an alternative exemplary embodiment, the motion detection module 70 may be embodied in software instructions stored in a memory of a camera and executed by a processing element of the camera.

The motion detection module 70 may include a feature extractor 72 and a feature tracker 74. The motion detection module 70, the feature extractor 72 and the feature tracker 74 may operate under the control of a processing element such as the controller 20 or a coprocessor which may be an element of the camera module 36. In an exemplary embodiment, the motion detection module 70 receives viewfinder video frame data 76, for example, from the camera module 36. The viewfinder video frame data 76 includes a series of frames of video data captured via the lens of the camera module 36. Each of the frames includes image data that may include objects, characters or other such visible features. As such, the viewfinder video frame data 76 in an exemplary embodiment is image data that has not been compressed or transformed.

Upon receipt of the viewfinder video frame data 76 at the motion detection module 70, the viewfinder video frame data 76 may be communicated to the feature extractor 72. The feature extractor 72 may be any device or means embodied in either hardware, software, or a combination of hardware and software that is capable of determining obvious features such as, for example, corners or points surrounded with complex texture in an image frame. When an obvious feature is identified in a frame, the feature tracker 74 may track the obvious feature in subsequent frames to compare relative positions of the obvious feature in each subsequent frame to determine an amount of motion of the obvious feature relative to a threshold which indicates whether the amount of motion should permit capturing of an image. The feature tracker 74 may be any device or means embodied in either hardware, software, or a combination of hardware and software that is capable of comparing relative positions of obvious features in adjacent image frames. In an exemplary embodiment, the feature tracker 74 may include a capability to determine whether obvious features in adjacent image frames correspond to each other.

Figure 4:
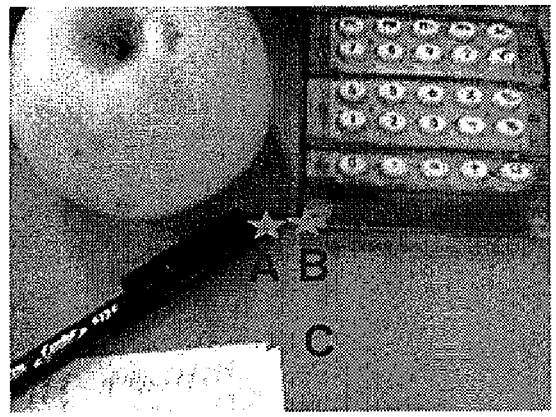
FIG. 4 is an illustration of a first image frame having three obvious features according to an exemplary embodiment of the present invention.
Figure 5:
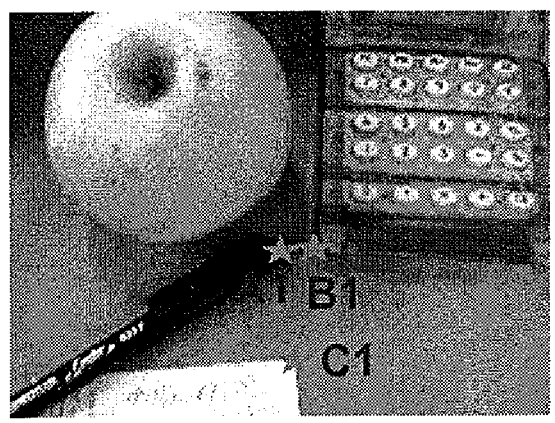
FIG. 5 is an illustration of the three obvious features in a second image frame according to an exemplary embodiment of the present invention.

It should be noted that any number of obvious features may be utilized for motion detection. In an exemplary embodiment, any number of pixel blocks that are identified as corner blocks may be determined to be obvious features. For example, FIG. 4 is a first image frame having three obvious features (namely A, B, and C). The three obvious features may be determined in accordance with a method for determining obvious features described in greater detail below. FIG. 5 is a second image frame showing the three obvious features (namely A1, B1 and C1, respectively) in a different frame. Accordingly, A represents a position of a first obvious feature in the first image frame and A1 represents a position of the first obvious feature in the second image frame. A difference between relative positions of A and A1 may be expressed as D1 which is substantially equal to a distance between A and A1. Similarly, B represents a position of a second obvious feature in the first image frame and B1 represents a position of the second obvious feature in the second image frame. A difference between relative positions of B and B1 may be expressed as D2 which is substantially equal to a distance between B and B1. Likewise, C represents a position of a third obvious feature in the first image frame and C1 represents a position of the third obvious feature in the second image frame. A difference between relative positions of C and C1 may be expressed as D3 which is substantially equal to a distance between C and C1. If D1, D2, and D3 are all below a threshold, the mobile terminal 10 may be considered to be in a fixed position relative to an object, character or other subject at which a viewfinder of the mobile terminal 10 is pointed. In other words, if D1, D2, and D3 are all below the threshold, the mobile terminal 10 may be considered stable. Thus, comparison of the distances D1, D2 and D3 to the threshold provides a determination as to whether the mobile terminal 10 is stable. In response to the distances D1, D2 and D3 all being below the threshold, the motion detection module 70 may communicate a perceived stable condition of the mobile terminal 10 to the capture module 71 as an indication of stability signal 96.

The threshold may be a predetermined value selected to ensure an amount of motion between image frames that is acceptable. In other words, the threshold may be preprogrammed to ensure that the amount of motion between image frames has an acceptable impact on image quality. Alternatively, the threshold may be a variable value. In an exemplary embodiment, the threshold may be a variable value selected based on a number of obvious features or a relative position of obvious features. For example, if a relatively low number of obvious features are detected near a center of an image frame, the threshold may be relatively low since such a low number of centrally located obvious features may be less capable of detecting rotation of the image in subsequent frames. Meanwhile, a relatively high number of obvious features near boundaries of the image frame may have a higher threshold since motion between image frames could be easier to detect in such a situation. As yet another alternative, the threshold may be a value that can be user selectable based on a desired image quality and therefore a desired acceptable motion between image frames. In this alternative embodiment, the user may select the threshold from a set of options provided, for example, in a list of options based on capabilities of the camera module 36 and/or the motion detection module 70.

It should be noted that although FIGS. 4 and 5 illustrate three obvious features, any number of obvious features may be selected. A predetermined number of obvious features may be employed such that the feature extractor 72 selects obvious features according to criteria described in greater detail below until the predetermined number is reached. Alternatively, an unlimited or random number of obvious features may be selected based on a concentration of features such as corners of objects, etc. in an image frame. It should be noted that although obvious feature determination will mainly be described herein in the context of corner detection, other criteria for determining obvious features may also be chosen as suggested above.

Figure 6:
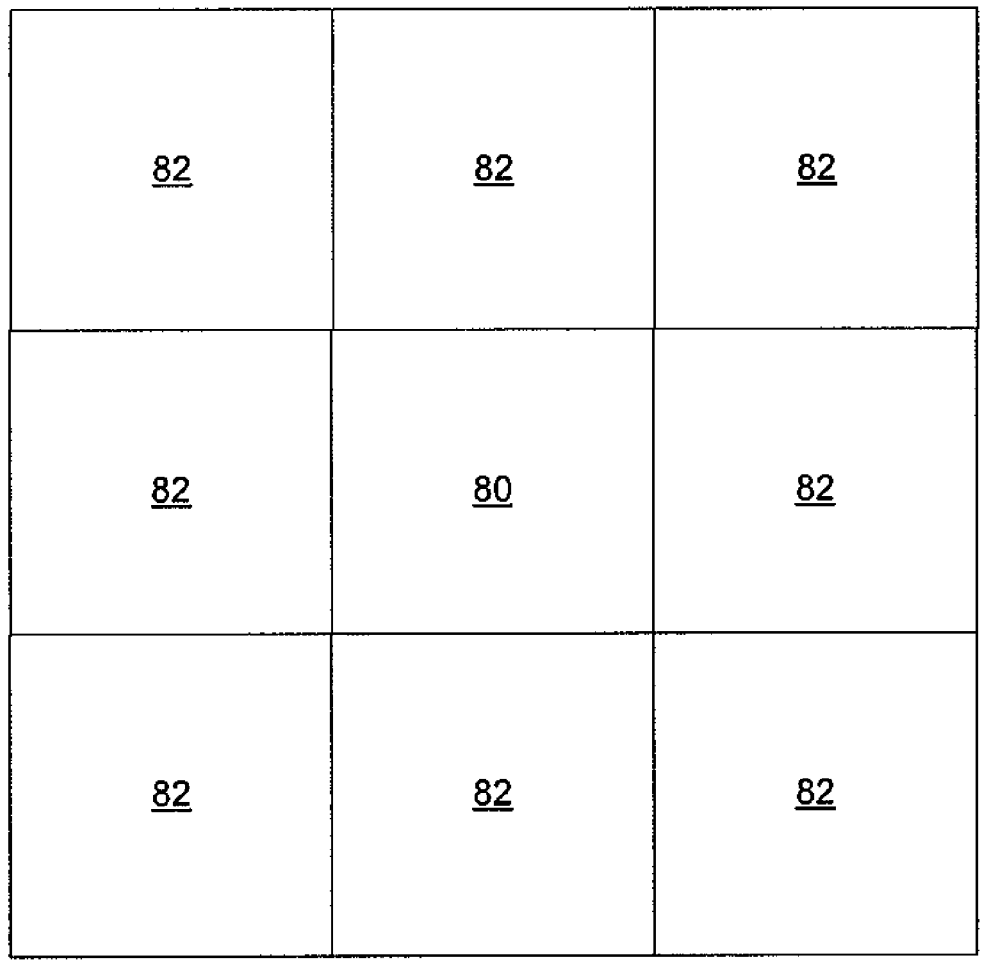
FIG. 6 is a schematic block diagram illustrating a potential corner block and eight neighboring blocks surrounding the potential corner block according to an exemplary embodiment of the present invention.

An exemplary embodiment in which corners are detected as obvious features will now be described in reference to FIG. 6. FIG. 6 illustrates a potential corner block 80 and eight neighboring blocks 82 surrounding the potential corner block 80 of a particular image frame. Each of the blocks of FIG. 6 may represent a pixel. As such, each of the blocks may include a greyscale value descriptive of information associated with the pixel. Alternatively, each of the blocks of FIG. 6 may represent a group of pixels. In any case, if the potential corner block 80 is a pixel or pixel group representing a corner of an object in a particular image, then there should be a relatively large greyscale or color difference between the corner block 80 and the eight neighboring blocks 82 in at least two directions. Meanwhile, if the potential corner block 80 instead represents, for example, a portion of a side edge of an object, then only blocks along the edge (i.e., blocks in one direction) may have substantially different greyscale values than that of the potential corner block 80, while all remaining blocks may have substantially similar greyscale values to that of the potential corner block 80. Furthermore, if the potential corner block 80 is disposed at an interior portion of an object, the potential corner block 80 may have a substantially similar greyscale value to that of each of the eight neighboring blocks 82.

The difference in energy amount E between a given image block and eight neighboring blocks of the given image block is written as shown in Equation (1) below.

$$E(x, y) = \sum_{u,v} W_{u,v} |I_{x+u,y+v} - I_{x,y}|^2 \qquad (1)$$

In Equation (1), $I_{x,y}$ represents the given image block, $I_{x+u,y+v}$ represents the eight neighboring blocks, and $W_{u,v}$ represents the weighted values for each of the eight neighboring blocks. The above formula is decomposed in Taylor criteria at (x, y) as shown below in Equation (2).

$$E(x, y) = \sum_{u,v} W_{u,v} |xX + yY + O(x^2, y^2)|^2 \qquad (2)$$

In Equation (2), $X = I \otimes (-1, 0, 1) = \partial I/\partial x$, and $Y = I \otimes (-1, 0, 1)^T = \partial I/\partial y$. Further, Equation (2) can be described as shown below in Equation (3).

$$E(x,y) = Ax^2 + 2Cxy + By^2 \qquad (3)$$

In Equation (3), $A = X^2 \otimes w$, $B = Y^2 \otimes w$, and $C = (XY) \otimes w$. Variable w represents a window region including the potential corner block 80 and the eight neighboring blocks 82 with a center at point (x,y). Finally, E(x,y) can be written in the matrix form as shown in Equation (4) below.

$$E(x, y) = (x, y) M (x, y)^T, \text{ where } M = \begin{bmatrix} A & C \\ C & B \end{bmatrix} \qquad (4)$$

In Equation (4), M describes a shape of E(x, y), if both eigenvalues of M are relatively small, then the given block is likely part of a smooth region. If both eigenvalues of M are relatively large, and E(x, y) shows a deep vale, then the given block likely includes a corner. If one eigenvalue is relatively large, while the other eigenvalue is relatively small, then the given block likely includes an edge. In an exemplary embodiment, in the context of eigenvalues of M, the terms "large" and "small" need not be quantified since they are relative terms. Thus, for example, if a point has a particular M eigenvalue of three times larger than those of adjacent or nearby points, then the particular M eigenvalue may be considered to be large. Alternatively, a threshold may be defined for determining whether the particular M eigenvalue is large or small. Thus, for example, the particular M eigenvalue may be compared to the threshold and if the particular M eigenvalue is above the threshold the particular M eigenvalue may be considered large.

Throughout an image frame, the two M eigenvalues of each pixel point are calculated by the feature extractor 72, and those points for which both M eigenvalues are relatively large may be retained for tracking as potential corners or obvious features. Points for which at least one of the M eigenvalues are relatively small are not tracked. For each potential corner in a same frame, a smaller M eigenvalue of the two relatively large M eigenvalues is sorted, and then a predetermined number of obvious features are selected from among the potential corners which have the largest smaller M eigenvalues. In the exemplary embodiment described above in reference to FIGS. 4 and 5, three obvious features (A, B and C) were selected, thus it can be assumed that potential corners corresponding to A, B and C had the three largest smaller M eigenvalues of all of the potential corners.

Figure 7:
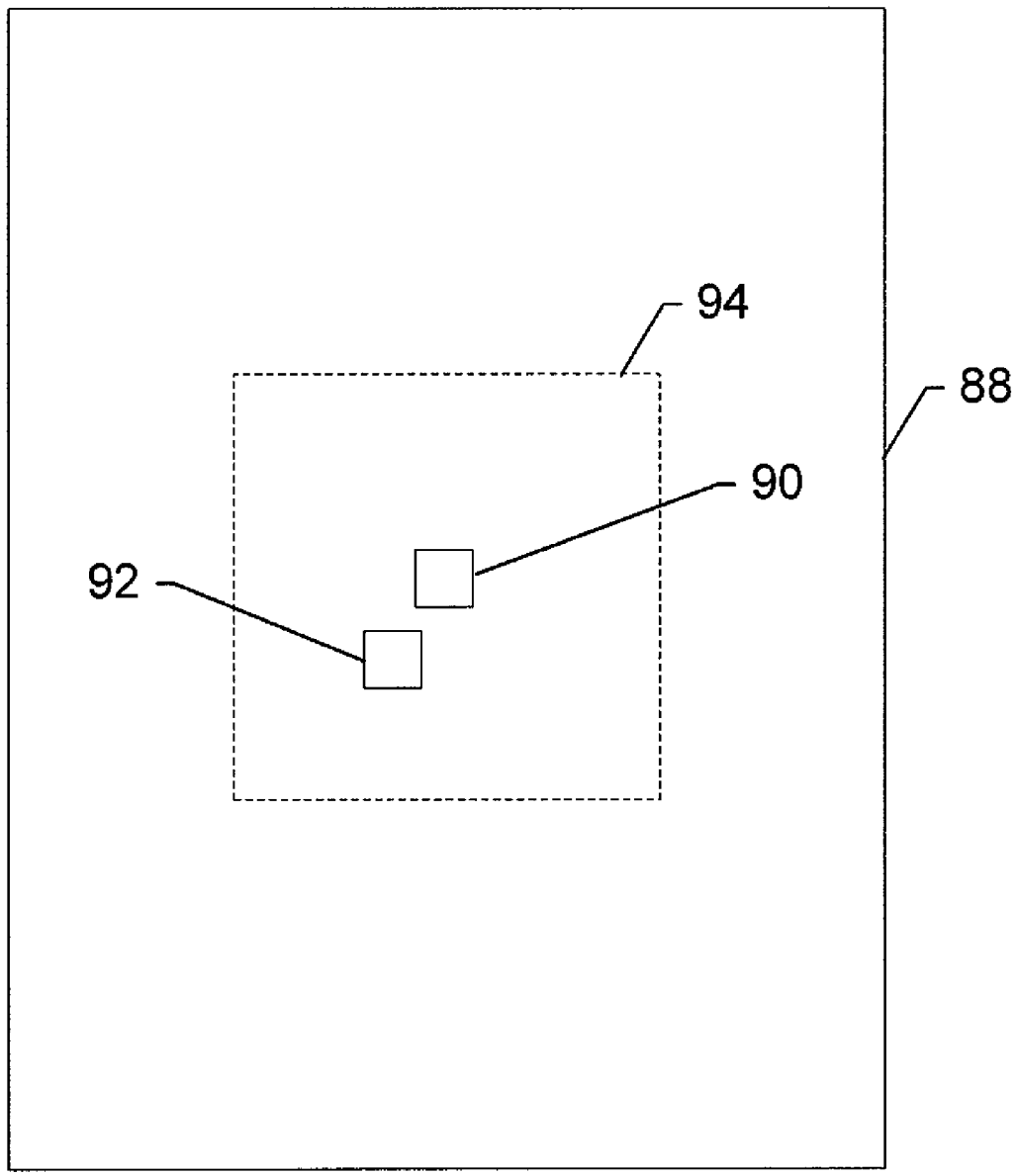
FIG. 7 is a schematic diagram illustrating block matching in first and second image frames according to an exemplary embodiment of the present invention.

Following selection of the obvious features at the feature extractor 72, the feature tracker 74 "tracks" the obvious features in subsequent frames to determine an amount of motion between frames as described above by determining a distance between obvious features in subsequent frames. Prior to making a determination regarding motion between frames as described above, it may be necessary to match obvious features in subsequent frames. Matching of obvious features may be necessary since motion of either the mobile terminal 10 (or camera), the object, or introduction of other objects may introduce new or eliminate previously identified obvious features. Thus, before a determination regarding motion between frames can be made, a determination that the obvious features from different frames correspond to each other (or match) may be made as a preliminary matter. A determination regarding matching of obvious features may be made using a template-based block matching method as shown in FIG. 7. FIG. 7 shows a first frame including a first obvious feature block 90 overlaid on a second frame including a second obvious feature block 92. The first and second obvious feature blocks 90 and 92 may be considered as matched if the first and second obvious feature blocks 90 and 92 fall within a matching region 94 as shown in FIG. 7. In an exemplary embodiment, the feature tracker 74 may be configured to dispose the matching region 94 concentrically relative to a first feature in a first image frame and then align boundaries of the first image frame with boundaries of a second image frame having a second feature. If the second feature is disposed within the matching region following the alignment, then the feature tracker 74 determines that the first and second features are matched and are capable of tracking as described above.

Accordingly, if the first and second obvious feature blocks 90 and 92 match, a determination as to the motion of the mobile terminal 10 may be made as described above. However, if the first and second obvious feature blocks 90 and 92 do not match, then no distance between the first and second obvious feature blocks 90 and 92 will be calculated and, consequently, no value may be compared to the threshold in order to determine that the mobile terminal 10 is stable. Thus, the mobile terminal 10 may be considered unstable. The matching region 94 may be of any suitable size and shape. A size and shape of the matching region 94 may be a predetermined or preprogrammed value. Alternatively, the user may select the size and shape of the matching region 94. The above described determination is repeated for each obvious feature.

It should be noted that an affine transformation may be helpful in block matching if there is geometric distortion to some extent in frames. However, affine transformation is time-consuming and in most use cases, affine transformation is not necessary, since the mobile terminal 10 will typically be held relatively stably while the user wants to capture a normal image. Thus, there should be relatively minimal geometric distortion between consecutive frames.

Following the determination as to whether the mobile terminal 10 is stable, the capture module 71 determines whether an image should be captured. The capture module 71 may be any device or means embodied in either hardware, software, or a combination of hardware and software that is capable of receiving user inputs and executing image capture responsive to the determination of stability of the mobile terminal 10. For example, if the mobile terminal 10 is determined to be stable, the capture module 71 may communicate with the camera module 36 to cause the camera module 36 to capture an image via an execution message 98 or any other suitable signal. Thus, in an exemplary embodiment, the capture module 71 may receive the indication of stability 96 from the motion detection module 70 in response to the determination of stability of the mobile terminal 10 and communicate the execution message 98 to the camera module 36 responsive to receipt of the indication of stability 96.

In an exemplary embodiment, the capture module 71 may send the execution message to the camera module 36 only after receiving the indication of stability 96 for a predetermined period of time or a predetermined number of frames. Alternatively, the motion detection module 70 may only send the indication of stability 96 after each of the distances between obvious features remains below the threshold for the predetermined period of time or the predetermined number of frames. In an exemplary embodiment, the predetermined period of time and/or the predetermined number of frames may be selected by the user. However, the predetermined period of time and/or the predetermined number of frames may also be a preprogrammed or fixed value.

Figure 8:
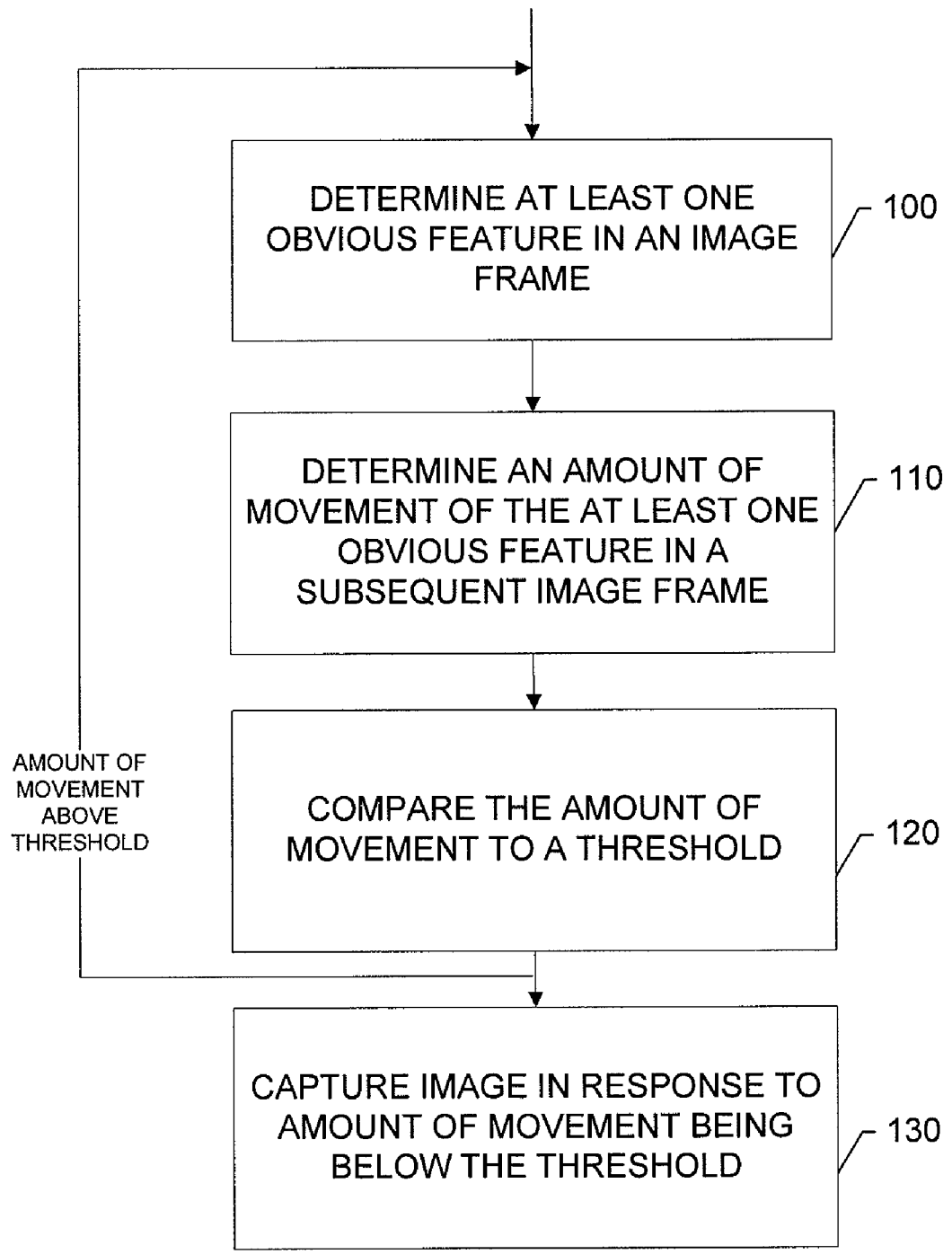
FIG. 8 is a flowchart according to an exemplary method of improving camera input user interface functionalities using a camera motion detection based scheme according to an exemplary embodiment of the present invention.

FIG. 8 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for improving camera input user interface functionalities using a camera motion detection based scheme includes selecting at least one obvious feature in an image frame at operation 100. At operation 110, an amount of movement of the at least one obvious feature between the image frame and an adjacent or subsequent image frame is determined. A comparison is made between the amount of movement and a threshold at operation 120. If the amount of movement is below the threshold, an image is captured automatically (i.e., without user interaction) at operation 130. The method may also include an operation of determining whether the at least one obvious feature has a matching feature in the adjacent image frame. Such step of determining matching features may be performed prior to determining the amount of movement of the at least one obvious feature. Accordingly, a method according to this exemplary embodiment may allow images or photographs to be automatically produced when a stable camera condition is detected, such that the user will not destabilize the camera while executing image capture. Furthermore, images will only be captured when the camera is stable, to ensure that images of suitable quality are captured.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining a corner block of at least one obvious feature in an image frame, the corner block being defined as a block of the image frame corresponding to a corner of an object represented in the image frame;
   determining an amount of movement of the corner block of the at least one obvious feature in a subsequent image frame;
   comparing the amount of movement to a threshold; and
   causing an image to be captured in response to the comparison of the amount of movement to the threshold.

2. A method according to claim 1, wherein determining the corner block of the at least one obvious feature comprises performing a mathematical comparison between a greyscale value of each pixel of an image to a greyscale value of each adjacent pixel and defining a particular pixel as an obvious feature in response to the pixel having a greyscale value that differs from the greyscale value of the adjacent pixels in at least two directions by at least a predefined amount.

3. A method according to claim 1, wherein determining the corner block is performed by comparing a greyscale value of the corner block to greyscale values of blocks surrounding the corner block.

4. A method according to claim 1, wherein determining the corner block of the at least one obvious feature comprises determining a predetermined number of obvious features.

5. A method according to claim 1, wherein causing the image to be captured further comprises capturing the image in response to the amount of movement being below the threshold for each of a number of subsequent image frames corresponding to a predetermined time period.

6. A method according to claim 1, further comprising determining a plurality of obvious features and wherein causing the image to be captured further comprises capturing the image in response to the amount of movement of each of the plurality of obvious features being below the threshold.

7. A method according to claim 1, wherein capturing the image further comprises capturing the image in response to the amount of movement being below the threshold for each of a predetermined number of subsequent image frames.

8. A method according to claim 1, further comprising determining whether the at least one obvious feature has a matching feature in the subsequent image frame.

9. A method according to claim 8, wherein determining whether the at least one obvious feature has the matching feature in the subsequent image frame comprises:
   disposing a matching region concentrically relative to the a first feature in a first image frame;
   aligning boundaries of the first image frame with boundaries of a second image frame having a second feature; and
   determining whether the second feature is disposed within the matching region.

10. A computer program product comprising at least one computer-readable non-transitory storage medium having computer-readable program code portions stored therein, the computer-readable program code portions comprising:
    a first executable portion for determining a corner block of at least one obvious feature in an image frame, the corner block being defined as a block of the image frame corresponding to a corner of an object represented in the image frame;
    a second executable portion for determining an amount of movement of the corner block of the at least one obvious feature in a subsequent image frame;
    a third executable portion for comparing the amount of movement to a threshold; and
    a fourth executable portion for causing an image to be captured in response to the comparison of the amount of movement to the threshold.

11. A computer program product according to claim 10, wherein the first executable portion includes instructions for performing a mathematical comparison between a greyscale value of each pixel of an image to a greyscale value of each adjacent pixel and defining a particular pixel as an obvious feature in response to the pixel having a greyscale value that differs from the greyscale value of the adjacent pixels in at least two directions by at least a predefined amount.

12. A computer program product according to claim 10, wherein the first executable portion further includes instructions for comparing a greyscale value of the corner block to greyscale values of blocks surrounding the corner block.

13. A computer program product according to claim 10, wherein the first executable portion includes instructions for determining a predetermined number of obvious features.

14. A computer program product according to claim 10, wherein the fourth executable portion further includes instructions for causing the image to be captured in response to the amount of movement being below the threshold for each of a number of subsequent image frames corresponding to a predetermined time period.

15. A computer program product according to claim 10, wherein the fourth executable portion further includes instructions for causing the image to be captured in response to the amount of movement being below the threshold for each of a predetermined number of subsequent image frames.

16. An apparatus comprising:
a processor; and
a memory including computer program code, the memory and the computer program code configured to, with the processor, cause the apparatus to at least:
determine a corner block of at least one obvious feature in an image frame, the corner block being defined as a block of the image frame corresponding to a corner of an object represented in the image frame;
determine an amount of movement of the corner block of the at least one obvious feature in a subsequent image frame and compare the amount of movement to a threshold; and
cause an image to be captured in response to the comparison of the amount of movement to the threshold.

17. A device according to claim 16, wherein the memory and the computer program code are further configured to, with the processor, cause the apparatus to perform a mathematical comparison between a greyscale value of each pixel of an image to a greyscale value of each adjacent pixel and define a particular pixel as an obvious feature in response to the pixel having a greyscale value that differs from the greyscale value of the adjacent pixels in at least two directions by at least a predefined amount.

18. A device according to claim 16, wherein the memory and the computer program code are further configured to, with the processor, cause the apparatus to determine the corner block by comparing a greyscale value of the corner block to greyscale values of blocks surrounding the corner block.

19. A device according to claim 16, wherein the memory and the computer program code are further configured to, with the processor, cause the apparatus to determine a predetermined number of obvious features.

20. A device according to claim 16, wherein the memory and the computer program code are further configured to, with the processor, cause the apparatus to vary the threshold in response to a user input.

21. A device according to claim 16, wherein the memory and the computer program code are further configured to, with the processor, cause the apparatus to vary the threshold in response to a number of the obvious features.

22. A device according to claim 16, wherein the memory and the computer program code are further configured to, with the processor, cause the apparatus to determine a plurality of obvious features and the capture module is configured to capture the image in response to the amount of movement being of each of the plurality of obvious features being below the threshold.

23. A device according to claim 16, wherein the memory and the computer program code are further configured to, with the processor, cause the apparatus to cause the image to be captured in response to the amount of movement being below the threshold for each of a number of subsequent image frames corresponding to a predetermined time period.

24. A device according to claim 16, wherein the memory and the computer program code are further configured to, with the processor, cause the apparatus to determine whether the at least one obvious feature has a matching feature in the subsequent image frame.

25. A device according to claim 23, wherein the memory and the computer program code are further configured to, with the processor, cause the apparatus to:
dispose a matching region concentrically relative to the a first feature in a first image frame;
align boundaries of the first image frame with boundaries of a second image frame having a second feature; and
determine whether the second feature is disposed within the matching region.

26. A mobile terminal comprising:
a feature extractor configured to determine a corner block of at least one obvious feature in an image frame, the corner block being defined as a block of the image frame corresponding to a corner of an object represented in the image frame;
a feature tracker in communication with the feature extractor, the feature tracker being configured to determine an amount of movement of the corner block of the at least one obvious feature in a subsequent image frame and compare the amount of movement to a threshold; and
a capture module in communication with the feature tracker, the capture module being configured to capture an image in response to the amount of movement being below the threshold.

27. A mobile terminal according to claim 26, wherein the feature tracker is further configured to perform a mathematical comparison between a greyscale value of each pixel of an image to a greyscale value of each adjacent pixel and defining a particular pixel as an obvious feature in response to the pixel having a greyscale value that differs from the greyscale value of the adjacent pixels in at least two directions by at least a predefined amount.

28. A mobile terminal according to claim 26, wherein the feature extractor is further configured to determine the corner block by comparing a greyscale value of the corner block to greyscale values of blocks surrounding the corner block.

29. A mobile terminal according to claim 26, wherein the feature extractor is further configured to determine a predetermined number of obvious features.

30. A mobile terminal according to claim 26, wherein the feature extractor is configured to determine a plurality of obvious features and the capture module is configured to capture the image in response to the amount of movement being of each of the plurality of obvious features being below the threshold.

31. A mobile terminal according to claim 26, wherein the capture module is configured to capture the image in response to the amount of movement being below the threshold for each of a number of subsequent image frames corresponding to a predetermined time period.

* * * * *